Feb. 26, 1957 L. F. REINHOLD 2,782,654
INTERMITTENT MOTION MECHANISM
Filed March 31, 1953 3 Sheets-Sheet 1
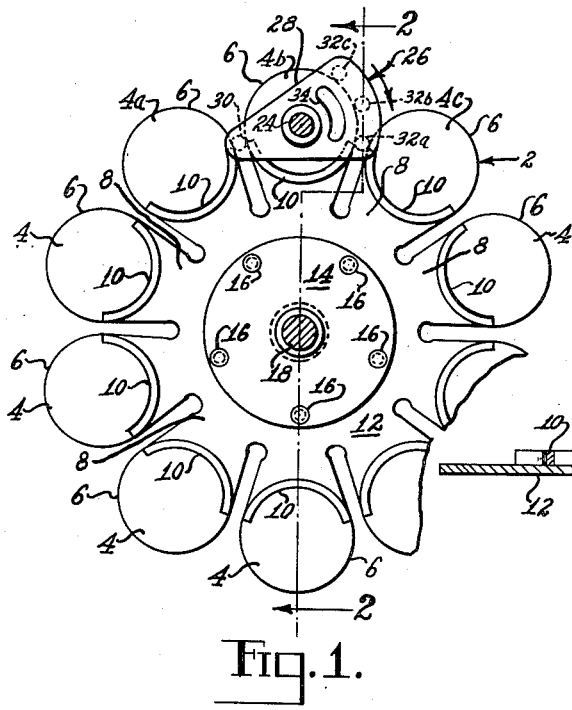
Fig.1.
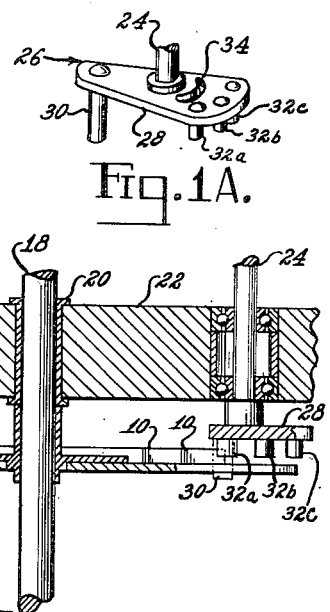
Fig.1A.
Fig.2.
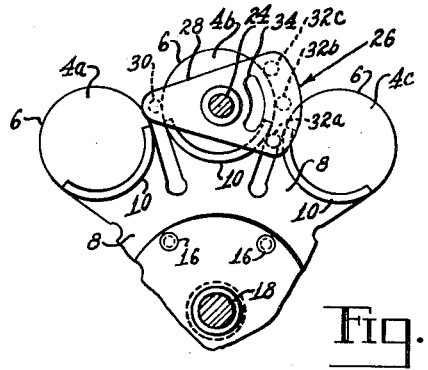
Fig.3.
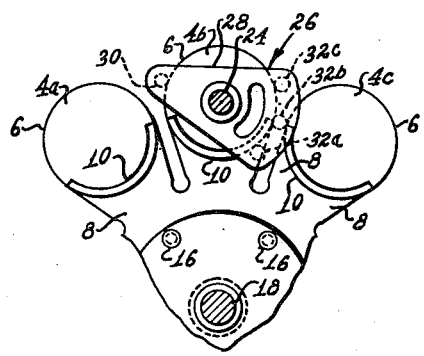
Fig.4.
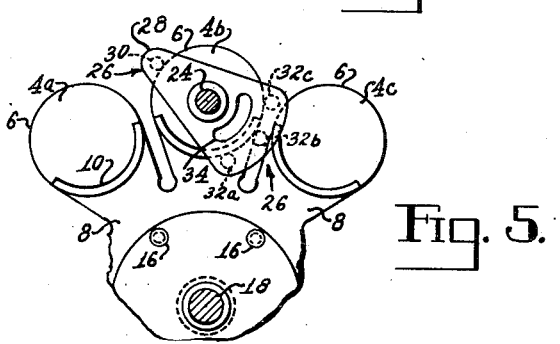
Fig.5.
INVENTOR.
LEONHARD FLORENS REINHOLD
BY Morris Rabkin
ATTORNEY

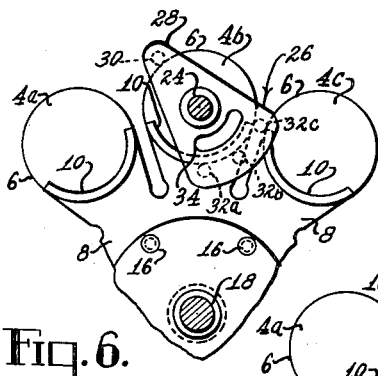
Fig.6.
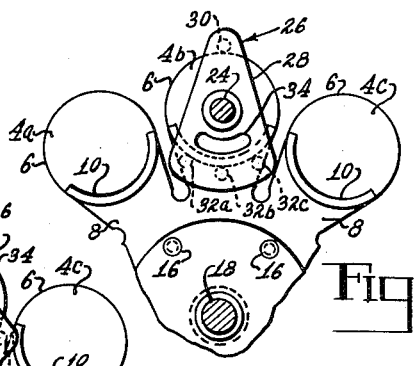
Fig.8.
Fig.7.
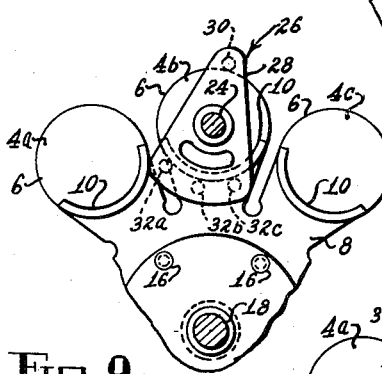
Fig.9.
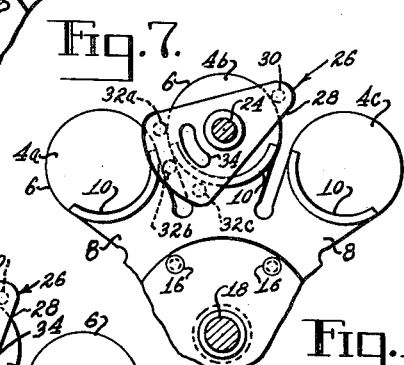
Fig.11.
Fig.10.
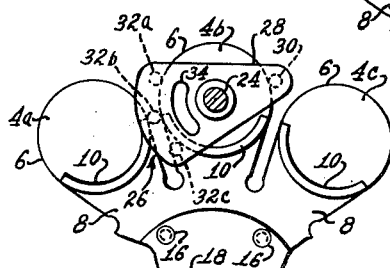
Fig.12.
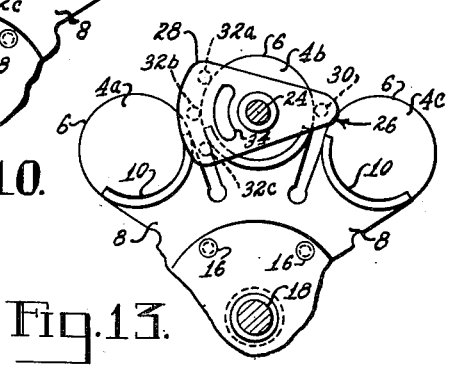
Fig.13.
INVENTOR.
LEONHARD FLORENS REINHOLD
BY
ATTORNEY Feb. 26, 1957 L. F. REINHOLD 2,782,654
INTERMITTENT MOTION MECHANISM
Filed March 31, 1953 3 Sheets-Sheet 3
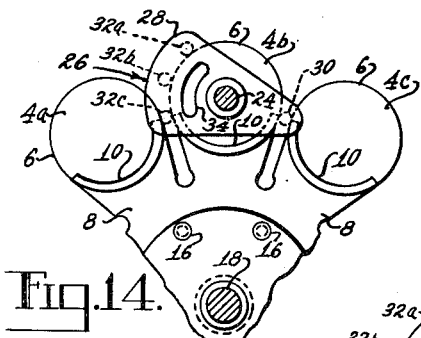
Fig. 14.
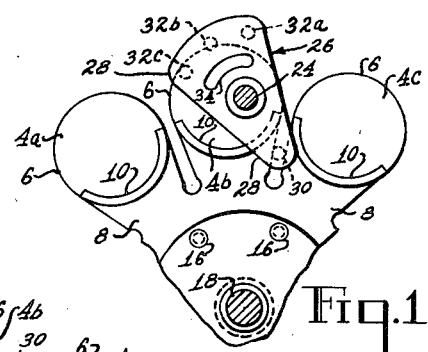
Fig. 16.
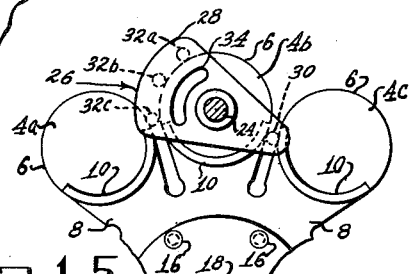
Fig. 15.
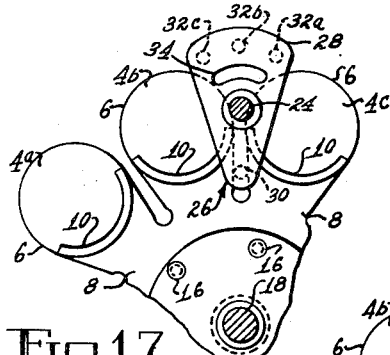
Fig. 17.
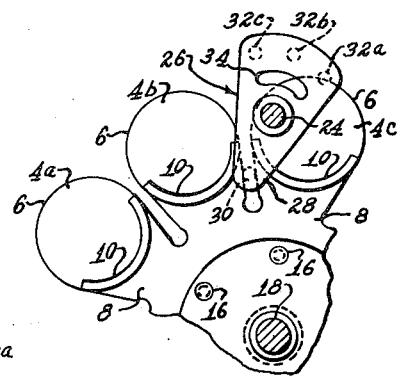
Fig. 19.
Fig. 18.
Fig. 20.
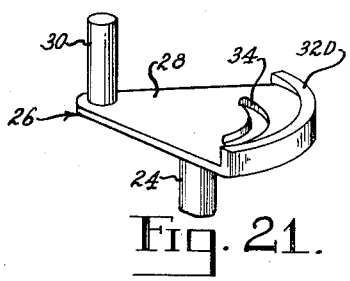
Fig. 21.
INVENTOR.
LEONHARD FLORENS REINHOLD
BY Morris␣␣Rabkin
ATTORNEY
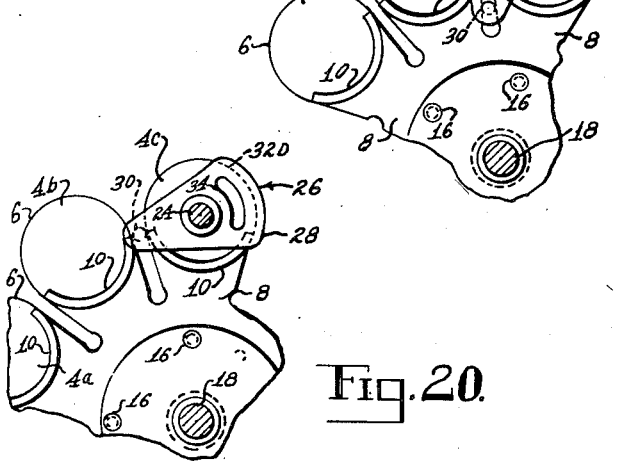

United States Patent Office 2,782,654
Patented Feb. 26, 1957

2,782,654
INTERMITTENT MOTION MECHANISM

Leonhard Florens Reinhold, Great Kills, N. Y., assignor to Radio Corporation of America, a corporation of Delaware Application March 31, 1953, Serial No. 346,007

The terminal 15 years of the term of the patent to be granted has been disclaimed 6 Claims. (Cl. 74—436)

This invention relates to power transfer mechanisms, and more particularly to intermittent motion mechanisms.

It has been found desirable to have a positive acting, reversible intermittent motion mechanism which is extremely accurate and capable of high speed operation. An example of equipment in which such a mechanism is shown is illustrated in U. S. Patent No. 2,733,871, issued to the present inventor. The apparatus is part of a signal recording and storage system such as may be used in a high speed computing system.

It is, accordingly, an object of this invention to provide a positive acting intermittent motion machanism which is characterized by its accuracy and capability of high speed operation.

It is another object of this invention to provide an intermittent motion mechanism which is characterized by its simplicity.

Still another object of this invention is to provide an intermittent motion mechanism as set forth in which the complementary members are in positive engagement at all times.

In accomplishing these and other objects, there has been provided, in accordance with the present invention, an intermittent motion mechanism which includes a follower wheel and a driving member. The follower wheel has a plurality of teeth having circular ends. Each tooth is provided with an arcuate lip which is complementary of the circle described by the end of the tooth. The driving member has a locking portion and a driving portion which cooperate with the features of the follower to produce the intermittent motion.

A better understanding of this invention may be had from the following detailed description when read in connection with the accompanying drawings in which, Figure 1 is a plan view, partly broken away of a driver and follower made in accordance with the present invention, Figure 1a is a perspective view of the driver, Figure 2 is a cross-sectional view taken along the line 2—2 of Figure 1, Figures 3 through 19 are fragmentary plan views illustrating the operation of the device shown in Figure 1, Figure 20 is a fragmentary plan view similar to that of Figure 1 but showing another form of apparatus embodying the present invention, and Figure 21 is a perspective view of the driver member shown in Figure 20.

Referring now to the drawings in more detail, there is shown a star-wheel 2 which has a plurality of teeth 4; in the drawing the wheel is shown as having ten teeth. Each tooth 4 on the star-wheel 2 includes a circular end portion 6 and a shank 8, the edges of which are substantially radial with respect to the star-wheel and tangential to the circle which defines the curvature of the end portion 6. Bridging the shank 8 on each of the teeth 4 is a lip 10. The lip 10 extends outwardly from the face of the tooth 4 and is so shaped that its outer surface constitutes a complement of the circle defining the end portion 6 of the tooth.

The star-wheel is illustrated as comprising a wheel-plate 12 secured to a hub member 14 by means of rivets 16 or the like. The hub 14 is, in turn, secured to a shaft 18. The shaft 18 is supported in a bearing 20 which is carried by a mounting plate 22.

Also carried by the mounting plate 22 in a position, adjacent to the shaft 18 of the star-wheel 2, is a second shaft 24 upon which is mounted a driving member 26. The driving member includes a plate portion 28, a driving element 30 and a locking element 32. The driving element 30 of the driving member 26 may be in the form of a pin which projects from the surface of the plate portion. The pin should be parallel the axis of the shaft 24 but spaced from that shaft. The locking element 32 may be a plurality of pins, as shown in Figures 1 to 19, projecting from the same face of the plate portion as the driving element 30 but spaced in an arc on the opposite side of the shaft 24. On the other hand, the locking element may be an arcuate lip 32d which projects from the face of the plate portion 28, as shown in Figure 21.

As indicated, each tooth 4 on the star-wheel 2 has an end portion 6 which is circular. The centers of the curvature of these circular ends lie on a circle drawn about the axis of the star-wheel shaft 18. The shaft 24 of the driving member 26 is spaced from the star-wheel shaft 18 a distance such that the axis of the second shaft intersects the circle defined by the centers of the curvature of the teeth 4. In other words, if the star-wheel is properly indexed, rotationally, the center of curvature of one of the teeth will coincide with the axis of the driving shaft 24. The driving element 30 is spaced from the axis of the driving shaft 24 a distance such that, when a tooth 4 of the star-wheel 2 is indexed with its center of curvature coinciding with the axis of the driving element 30, it will be tangent to the circle defining the tooth. Similarly, the locking element 32 has a surface which is positioned to fall along the circle defining the tooth. However, the locking element 32 embraces a substantial arc of the circle while the driving element 30 does not.

When the locking element is in the form of a plurality of pins as shown, for example, in Figure 2 where the locking element comprises three pins 32a, 32b, and 32c, the pins are spaced with their centers on a circle the radius of which is equal to the radius of tooth circle plus the radius of the pins themselves. When the locking element is in the form of a lip as shown, for example, in Figure 21, the lip extends outwardly from the plate portion in a circular arc the inner radius of which is substantially equal to the radius of the tooth circle.

The star-wheel 2 is secured to its shaft 18 and lies in a plane parallel to, but spaced from the mounting plate 22. The driving member 26 is similarly mounted with the plate portion 28 parallel to and slightly spaced from the star-wheel.

The lip 10 on each of the teeth of the star-wheel is positioned to extend toward the driving member 26. Similarly, the driving element 30 and the locking element 32 on the driving member 26 are directed toward the star-wheel. The spacing between the star-wheel and the driving member, and the height of the lips 10 and the locking members 32 is so arranged that the locking members 32 clear the main body of the wheel-plate 12 but overlap the lip 10. The driving element 30 is longer than the locking element 32, and extends past the star-wheel 2, to engage the periphery thereof.

When the driving member 26 is rotated, the coaction between that member and the star-wheel follows the procedure illustrated, in steps, in Figures 1 and 3 to 20. Figure 1, for example, may be assumed to illustrate the start of a cycle wherein the tooth 4b is securely locked between the driving element 30, which engages one side of the tooth 4b at the point where the edge of the shank 8 is tangent to the circular end, and the first pin 32a of the locking element, which engages the end of the lip 10 extending across the shank 8 of the tooth 4b. The position may also be considered as the terminating position for the cycle next preceding, the preceding tooth 4a having just been shifted to the position it occupies. The slots between the teeth, defined by the parallel edges of the shanks of adjacent teeth are of a width substantially equal to the thickness of the driving element 32. This arrangement provides a minimum of noise and lost motion when the driving element transfers its engagement from one tooth 4a on the completion of one cycle to the next tooth 4b at the beginning of the next cycle. Further, the arrangement provides accurate indexing of the star-wheel for the beginning of the next cycle.

In Figure 3 the driving member 26 has been rotated through about 18°. The first pin 32a of the locking element engages the lip 10 of the tooth 4a and has started to pass over the shank 8 of the tooth. The longer driving element 30 still engages the periphery of the rounded end portion of the tooth, locking the tooth in position.

Figures 4, 5, 6 and 7 illustrate small increments of advancement of the driving member 26 during which time the tooth 4a is positively locked between the driving element 30 engaging the periphery of the tooth, and the locking element 32 engaging the arcuate lip 10 bridging the shank 8 of the tooth.

In Figure 8 the driving member 26 is illustrated as being dead-centered. In this position, the driving element 30 does not contribute to the locking action. However, the tooth 4b is held securely against movement by locking element 32 which fully engages the lip 10.

In Figures 9 through 14 is shown, in further incremental steps, the rotation of the driving member 26, the tooth 4b of the star-wheel remaining locked between the driving element and the locking element.

In Figure 15, the locking member 32 is shown as it clears the lip 10, unlocking the star-wheel. The long driving element 30 has moved past the curved end-portion 6 of the tooth 4b and has moved into engagement with the straight shank 8 of the tooth, thus starting the advancement of the star-wheel 2. The shorter locking element 32 passes over the face of the tooth after it clears the locking lip 10.

The mechanism is shown in further incremental steps of the advancement of the star-wheel 2 by the driving member 26 in Figures 16 through 19.

Figure 20 shows the assembly again in position to start another cycle. However, in Figure 20 the driving member 26 is shown as having its locking element in the form of a lip 32d, more clearly shown in Figure 21, which matches the curvature of the lip 10 on the shanks 8 of the teeth. In Figure 20, it is also shown that as soon as the advancement of tooth 4b has been completed, the driving member 26 engages and locks the next tooth 4c.

Since it is contemplated that the mechanism will be used in high-speed operations, the plate portion 28 of the driving member 26 is provided, in its larger end adjacent the locking element 32, with a slot or opening 34. The purpose of the slot or opening 34 is to balance the mass of the two ends of the driving member 26 and to reduce the mass, hence, the inertia of the driving member.

Thus it may be seen that there has been provided an improved intermittent motion mechanism which is positive in its operation, both in the advancing and stationary phases; which is simple in construction and operation; and which is capable of high speed operation.

What is claimed is:

1. In an intermittent motion mechanism comprising, in combination, a star-wheel having a plurality of teeth, each tooth of said star-wheel having a circular end portion, a shank, and a locking lip extending outwardly from said tooth and bridging said shank, said lip being arcuate and complementary of said circular end portion to define with said circular end portion a circular track at the end of the tooth, a driving member cooperatively associated with said star-wheel, said driving member including a driving element for periodically advancing said star-wheel and a locking element, said driving element being engageable with the periphery of the teeth of said star-wheel, said locking element being engageable with said locking lip to effect, in cooperation with said driving element, positive locking of said star-wheel during periods between said periodic advancements.

2. In an intermittent motion mechanism comprising, in combination, a star-wheel having a plurality of teeth, each tooth of said star-wheel having a circular end portion, a shank, and a locking lip extending outwardly from said tooth and bridging said shank, said lip being arcuate and complementary of said circular end portion to define with said circular end portion a circular track at the end of the tooth, a driving member cooperatively associated with said star-wheel, said driving member being positioned in spaced, parallel relation with respect to said star-wheel, said lip on each of said teeth being directed toward said driving member, said driving member including a driving element for periodically advancing said star-wheel and a locking element, said driving element being engageable with the periphery of the teeth of said star-wheel, said locking element being engageable with said lip to effect, in cooperation with said driving element, positive locking of said star-wheel during periods between said periodic advancements.

3. In an intermittent motion mechanism comprising, in combination, a star-wheel having a plurality of teeth, each tooth of said star-wheel having a flat circular end portion, a shank, and a locking lip extending outwardly from said tooth and bridging said shank, said lip being arcuate and complementary of said end portion to define with said end portion a circular track at the end of the tooth, a driving member cooperatively associated with said star-wheel, said driving member being positioned in spaced, parallel relation with respect to said star-wheel, said lip on each of the teeth of said star-wheel being directed toward said driving member, said driving member including a driving element engageable with the periphery of the teeth of said star-wheel for periodically advancing said star-wheel and a locking element, said locking element comprising at least one projection extending outwardly from said driving member toward said star-wheel, said projection being engageable with said lip to effect in cooperation with said driving element positive locking of said star-wheel during periods between said periodic advancements.

4. The invention as set forth in claim 1 wherein said locking element comprises a plurality of pins projecting from said driving member and positioned to define a circular arc having a radius substantially equal to the radius of a circular track.

5. The invention as set forth in claim 1 wherein said locking element comprises a lip projecting from said driving member and defining a circular arc having a radius substantially equal to the radius of a circular track.

6. In an intermittent motion mechanism, in combination, a star-wheel having a plurality of teeth, each tooth of said star-wheel having a circular end portion, a shank and a locking lip extending outwardly from a face of said star-wheel and bridging said shank, said lip being arcuate and complementary of said circular end portion to define with said circular end portion a circular track at the end of the tooth, a driving member cooperatively associated with said star-wheel, said driving member including a driving element for periodically advancing said star-wheel and a locking element, said driving element being engageable with the periphery of the teeth of said star wheel, said locking element being engageable with said locking lips, said driving and locking elements confining a circular track during periods between said periodic advancements to effect positive locking of said star-wheel.

References Cited in the file of this patent

UNITED STATES PATENTS

| | | |
|---|---|---|
| 1,252,823 | Ludington | Jan. 8, 1918 |
| 2,345,139 | Martin | Mar. 28, 1944 |
| 2,364,746 | Nemnich | Dec. 12, 1944 |

FOREIGN PATENTS

| | | |
|---|---|---|
| 118,934 | Australia | Sept. 21, 1944 |